(12) United States Patent
Chien et al.

(10) Patent No.: US 8,707,328 B2
(45) Date of Patent: Apr. 22, 2014

(54) ELECTRONIC DEVICE AND APPLICATION PROGRAM SWITCHING METHOD THEREOF

(75) Inventors: Chih-Ling Chien, Taoyuan County (TW); Francois Bellet-Odent, Taoyuan County (TW)

(73) Assignee: HTC Corporation, Taoyuan County (TW)

( * ) Notice: Subject to any disclaimer, the term of this patent is extended or adjusted under 35 U.S.C. 154(b) by 1467 days.

(21) Appl. No.: 12/129,664

(22) Filed: May 29, 2008

(65) Prior Publication Data

US 2009/0113456 A1    Apr. 30, 2009

(30) Foreign Application Priority Data

Oct. 25, 2007 (TW) ................................ 96140046 A

(51) Int. Cl.
*G06F 3/00* (2006.01)
*G06F 9/44* (2006.01)
*G06F 9/46* (2006.01)
*G06F 13/00* (2006.01)
*H04M 1/00* (2006.01)

(52) U.S. Cl.
USPC ........... 719/313; 719/318; 719/320; 719/321; 455/575; 455/567

(58) Field of Classification Search
None
See application file for complete search history.

(56) References Cited

U.S. PATENT DOCUMENTS

| 2002/0102946 | A1* | 8/2002 | SanGiovanni ................... 455/90 |
| 2003/0100347 | A1* | 5/2003 | Okada et al. .................. 455/567 |
| 2005/0168446 | A1* | 8/2005 | Majdoub ....................... 345/168 |
| 2005/0187024 | A1* | 8/2005 | Cho et al. ......................... 463/46 |
| 2006/0176524 | A1* | 8/2006 | Willrich ........................ 358/474 |
| 2007/0218963 | A1  | 9/2007 | Kim |

FOREIGN PATENT DOCUMENTS

| CN | 1369167   | 9/2002 |
| CN | 1649357   | 8/2005 |
| TW | 200709058 | 3/2007 |
| TW | 200709644 | 3/2007 |
| TW | 200719668 | 5/2007 |

* cited by examiner

*Primary Examiner* — H S Sough
*Assistant Examiner* — Craig Dorais
(74) *Attorney, Agent, or Firm* — Jianq Chyun IP Office

(57) ABSTRACT

An application program switching method for an electronic device having a first body and a second body is provided. A relative position of the first body and the second body is changed from a first state to a second state to activate a second application program while an external message is received during a first application program being executed, and an image displayed by the electronic device is switched from an executing frame of the first application program to an executing frame of the second application program for replying the external message via a keyboard of the second body. Next, the relative position of the first body and the second body is changed from the second state to the first state, and the image displayed by the electronic device is switched from the executing frame of the second application program to the executing frame of the first application program.

13 Claims, 6 Drawing Sheets

ELECTRONIC DEVICE AND APPLICATION PROGRAM SWITCHING METHOD THEREOF

CROSS-REFERENCE TO RELATED APPLICATION

This application claims the priority benefit of Taiwan application serial no. 96140046, filed on Oct. 25, 2007. The entirety of the above-mentioned patent application is hereby incorporated by reference herein and made a part of specification.

BACKGROUND OF THE INVENTION

1. Field of the Invention

The present invention relates to an electronic device. More particularly, the present invention relates to an electronic device and an application program switching method thereof.

2. Description of Related Art

With a general trend of light weighted and thin sized of the electronic devices, users are gradually used to carry these electronic devices around. General electronic devices such as laptops, personal digital assistances (PDAs) and cell phones etc. have become indispensable in our daily life. Moreover, development of technologies is driven by demanding of life convenience for peoples, and therefore more and more diversified functions are integrated in electronic devices.

Taking the cell phones as an example, the present cell phones not only have a function of making calls, but also have the functions of taking picture, video recording, MP3 music playing, internet surfing, SMS message and MMS message transceiving, mobile secretary and JAVA gaming etc. Generally, when an external message is received during an application program of the cell phone, for example, music playing being executed, a user has to press a key to stop or pause the music playing, and then presses a hot key or other keys to find out and execute a corresponding application program for replying the income message. Therefore, such switching method of the application program is not humanized and inconvenient for the user.

SUMMARY OF THE INVENTION

The present invention is directed to a convenient application program switching method.

The present invention is directed to a convenient electronic device.

The present invention provides an application program switching method for an electronic device. The electronic device has a first body and a second body, wherein the second body has a keyboard. The application program switching method is as follows. First, an external message is received during a first application program being executed. Next, a relative position of the first body and the second body is changed from a first state to a second state to activate a second application program, and a displayed image of the electronic device is switched from an executing frame of the first application program to an executing frame of the second application program for replying the external message, wherein the keyboard functions as an input interface of the second application program. Finally, the relative position of the first body and the second body is changed from the second state to the first state, and the displayed image of the electronic device is switched from the executing frame of the second application program to the executing frame of the first application program to continually execute the first application program.

The present invention further provides an electronic device with a first display screen, and the electronic device includes a first body and a second body. Wherein, the second body is connected to the first body and has a keyboard. When an external message is received during a first application program being executed, a relative position of the first body and the second body is changed from a first state to a second state to activate a second application program of the electronic device, and a displayed image of the electronic device is switched from an executing frame of the first application program to an executing frame of the second application program for executing the second application program to reply the external message via the keyboard. When the relative position of the first body and the second body is changed from the second state to the first state, the displayed image of the electronic device is switched from the executing frame of the second application program to the executing frame of the first application program to continually execute the first application program.

Based on the electronic device and the application program switching method thereof provided by the present invention, application programs of the electronic device may be switched by simply and intuitively changing the relative position of the first body and the second body of the electronic device. Therefore, the electronic device and the application program switching method thereof provided by the present invention is continent for the users.

In order to make the aforementioned and other objects, features and advantages of the present invention comprehensible, a preferred embodiment accompanied with figures is described in detail below.

DESCRIPTION OF EMBODIMENTS

Figure 1:
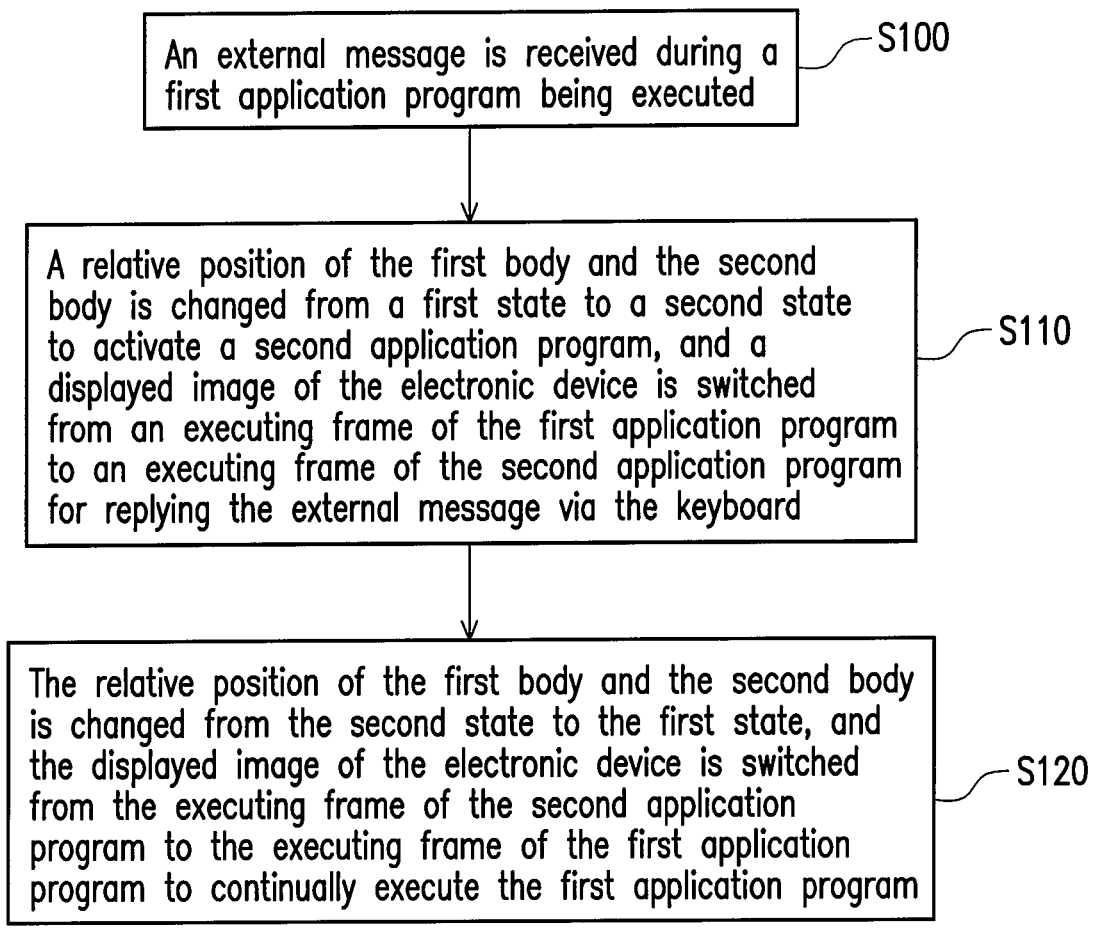
FIG. 1 is a flowchart of an application program switching method according to an embodiment of the present invention.

FIG. 1 is a flowchart of an application program switching method according to an embodiment of the present invention. The application program is suitable for an electronic device including a first body and a second body, wherein the second body has a keyboard. Referring to FIG. 1, the application program switching method is as follows. First, in step S100, an external message is received during a first application program being executed. Next, in step S110, a relative position of the first body and the second body is changed from a first state to a second state to activate a second application program, and a displayed image of the electronic device is switched from an executing frame of the first application program to an executing frame of the second application program for executing the second application program to reply the external message via the keyboard. Finally, in step S120, the relative position of the first body and the second body is changed from the second state to the first state, and the displayed image of the electronic device is switched from the executing frame of the second application program to the executing frame of the first application program to continually execute the first application program.

As described above, when the application program switching method of the present invention is applied, the state of the electronic device may be changed manually (for example, expanded), so as to switch the application program of the electronic device. Moreover, since replying the external message requires execution of the second application program, and the keyboard has to be utilized when the second application program is executed, an intuitive reaction of a user is to change the relative position of the first body and the second body to facilitate utilization of the keyboard, so as to reply the external message. In other words, only a single action of the user based on the intuitive reaction is required, replying of the external message may be accomplished. Therefore, the application program switching method of the present invention is continent for the users.

To further describe the application program switching method, embodiments for the electronic devices of the present invention are provided below, wherein the electronic devices of the present invention may apply the aforementioned application program switching method.

First Embodiment

Figure 2A:
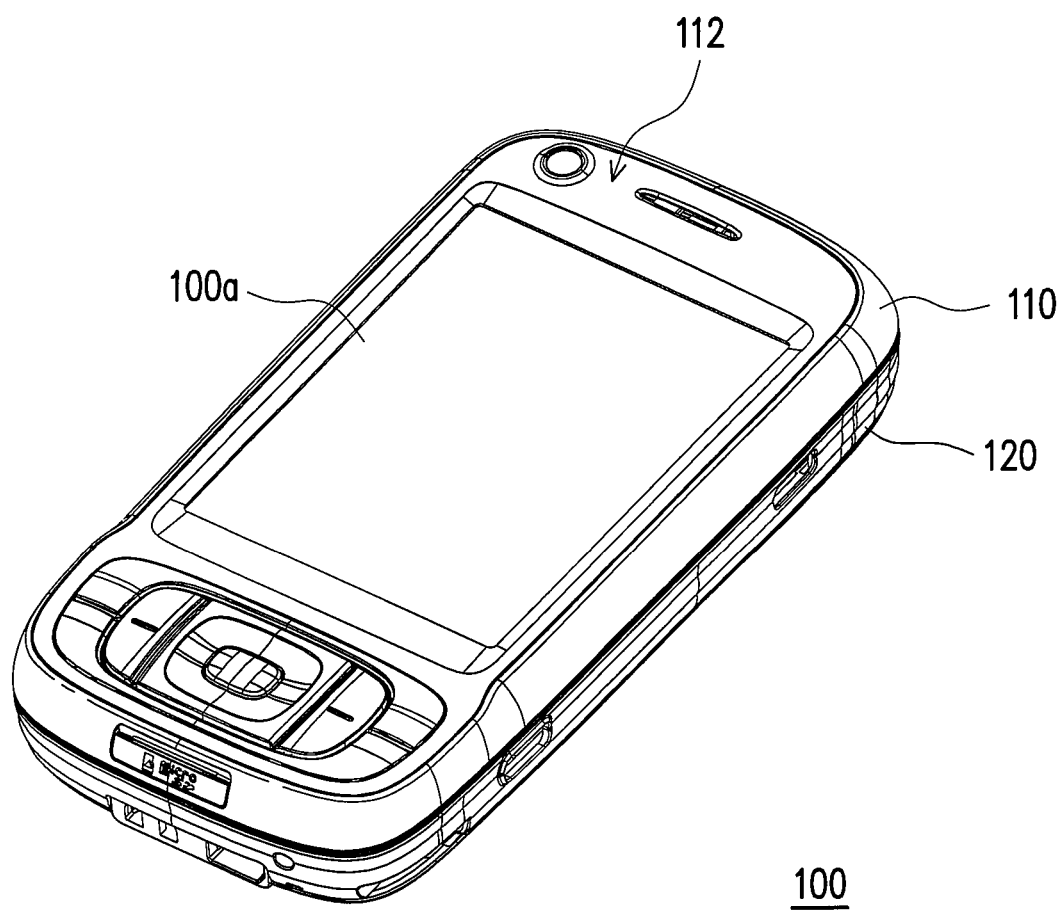
FIG. 2A and FIG. 2B are schematic diagrams respectively illustrating an electronic device with a first state and a second state according to a first embodiment of the present invention.
Figure 2B:
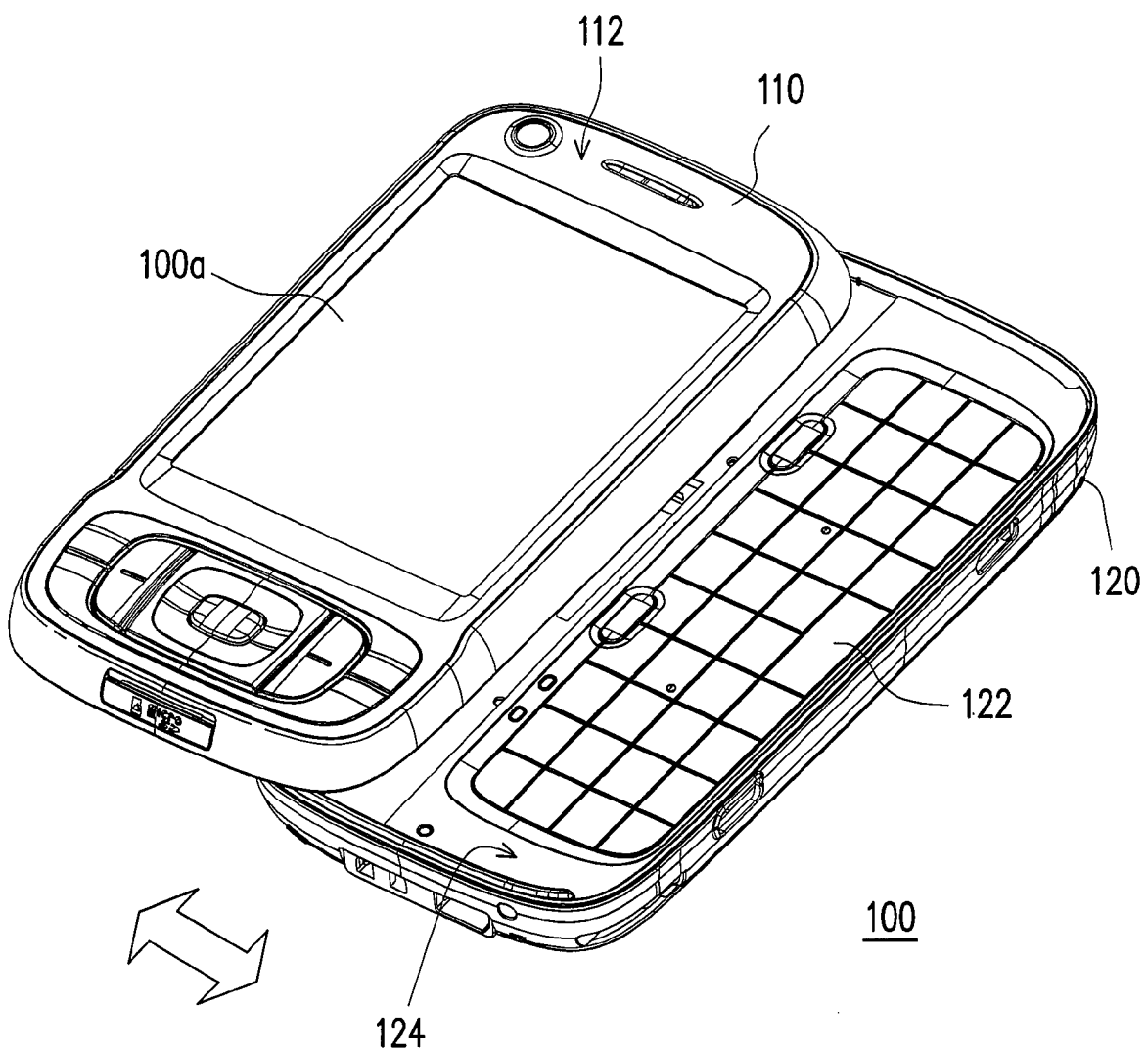

FIG. 2A and FIG. 2B are schematic diagrams respectively illustrating an electronic device with a first state and a second state according to the first embodiment of the present invention. Referring to FIG. 2A and FIG. 2B, the electronic device 100 may be a slide PDA or other slide electronic devices such as an ultra mobile PC (UMPC) or a cell phone. The electronic device 100 has a first display screen 100a, and the electronic device 100 includes a first body 110 and a second body 120 connected to the first body 110. Wherein, the first display screen 100a is disposed on a surface 112 of the first body 110, and is located relatively far away from the second body 120.

The second body 120 is connected to the first body 110 via a sliding mechanism (not shown), and the sliding mechanism may be a sliding hinge. Therefore, the first body 110 may be level shifted relative to the second body 120 via the sliding mechanism. To be specific, the sliding mechanism may be composed of a siding block and a sliding rail, wherein the sliding block is disposed on the first body 110, the sliding rail is disposed on the second body 120, and the sliding block is set correspondingly in the sliding rail. Certainly, the sliding block may also be disposed on the second body 120, and the sliding rail may be correspondingly disposed on the first body 110, which may be varied according to an actual requirement. For terseness, the sliding block and the sliding rail are not illustrated. However, it should be understood by those skilled in the art that the sliding mechanism of the present embodiment may be substituted by other sliding hinges or other device combinations (such as rack and gear). Therefore, combination of the sliding mechanism is not limited by the present embodiment.

In addition, the second body 120 has a keyboard 122, while the keyboard 122 is disposed on a surface 124 of the second body 120, and faces to the first body 110. For example, symbols of the keyboard 122 include numbers, English letters, phonetic symbols or other symbols. In the present embodiment, the keyboard may be a physical keyboard or a virtual keyboard, wherein the virtual keyboard may be a keyboard image displayed on a touch screen.

After the electronic device 100 is turned on, the electronic device 100 enters a standby state, and now the relative position of the first body 110 and the second body 120 is in the first state, and the first body 110 and the second body 120 are stacked with one another.

Referring to FIG. 1, FIG. 2A and FIG. 2B, when the first application program is executed on the electronic device 100, the executing frame of the first application program is displayed on the first display screen 100a, as described in the step S100. The first application program of the electronic device 100 may be a built-in online game, a screen saver program, a web browser, a JAVA game, video or picture player, or blue tooth wireless transmission etc. When the electronic device 100 executes the first application program, an external message may still be received, and the external message may be an instant massage, a multimedia message, a short message from a cell phone, an e-mail or other kind of messages.

Figure 3A:
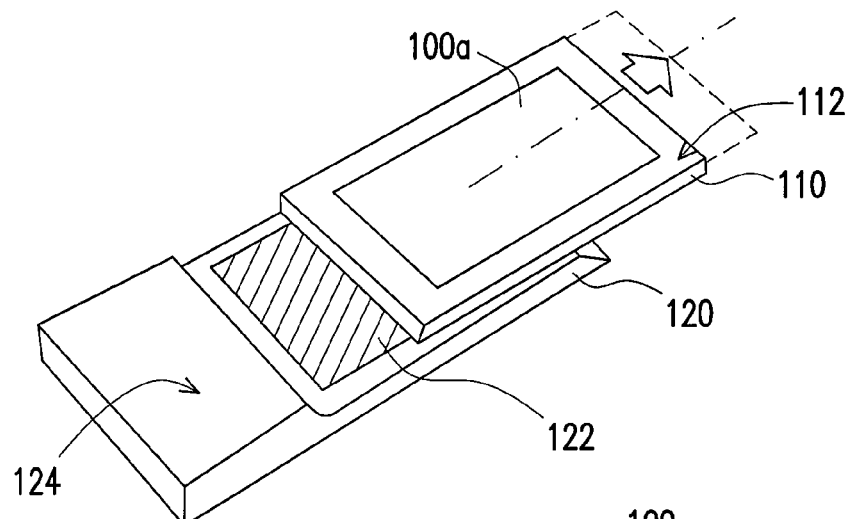
FIG. 3A and FIG. 3B are schematic diagrams respectively illustrating different level shifting directions of a first body relative to a second body.
Figure 3B:
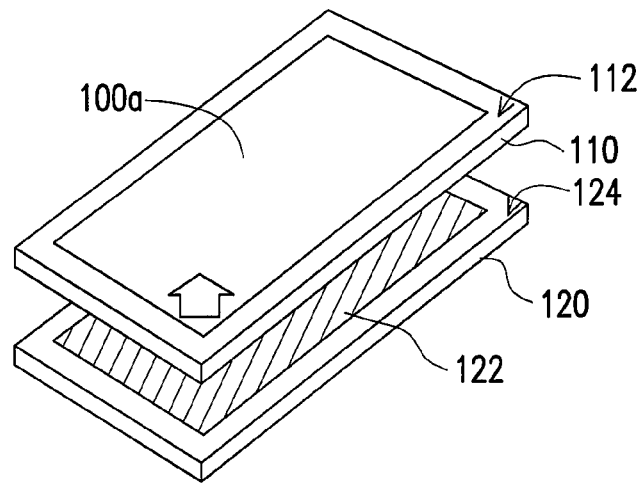

After the external message is received by the electronic device 100, the user may decide whether or not to reply the external message. If the external message is about to be replied, the user may change the relative position of the first body 110 and the second body 120 from the first state to the second state to activate the second application program of the electronic device 100, as described in the step S110. In the present embodiment, changing the relative position of the first body 110 and the second body 120 from the first state to the second state is to level shift the first body 110 relative to the second body 120, so as to depart the first body 110 and the second body 120 originally stacked together. In the present embodiment, the first body 110 is pushed towards a width direction of the electronic device 100 to depart from the second body 120, so as to activate the second application program. It should be understood by those skilled in the art that level shifting direction of the second body 120 relative to the first body 110 may be determined according to the actual requirement. FIG. 3A and FIG. 3B are schematic diagrams respectively illustrating a different level shifting direction of a second body relative to a first body. Referring to FIG. 3A and FIG. 3B, the first body 110 may be level shifted relative to the second body 120 along a length direction or along an oblique direction, so as to expose the keyboard 122.

Meanwhile, the executing frame of the second application program is displayed on the first display screen 100a of the electronic device 100, and now the keyboard 122 is exposed. Therefore, the user may press keys on the keyboard 122 to execute the second application program and reply the external message.

To be specific, when the executing frame of the second application program is displayed on the first display screen 100a, execution of the first application program may be paused. Alternatively, to keep the privacy of the user, the first application program may be continually executed in background according to the actual requirement, and the executing frame of the second application program may be transitorily displayed on the first display screen 100a, and then the executing frame of the first application program is immediately switched back.

When execution of the second application program is completed and the first application program is required to be continually executed, the relative position of the first body 110 and the second body 120 of the electronic device 100 is changed from the second state to the first state, as described in the step S120. In the present embodiment, changing the relative position of the first body 110 and the second body 120 from the second state to the first state is to level shift the first body 110 relative to the second body 120, such that the first body 110 may be closed up to the second body 120, and finally the first body 110 may be stacked with the second body 120.

Meanwhile, the executing frame of the application program is displayed on the first display screen 100a, so as to continually execute the first application program.

In summary, when the external message is received during the first application program being executed, the user may push the first body of the electronic device for level shifting the first body relative to the second body to expose the keyboard of the electronic device, so as to activate the second application program, and then the executing frame of the second application program is displayed on the display screen of the electronic device, such that the user may reply the external message via the keyboard. By such means, the electronic device and the application switching method thereof based on the present embodiment have the advantages of laboursaving and timesaving, which are continent for the users.

It should be noted that the first state of the relative position between the first body and the second body is that the first body is totally overlapped and stacked with the second body, and the second state of the relative position between the first body and the second body is that the first body is departed from the second body, but a portion there between is still overlapped. According to the actual requirement, those skilled in the art may choose other connection state to be the first state of the relative position between the first body and the second body without departing from the spirit and scope of the present invention. For example, the first body and the second body may all be partially overlapped under the first state and the second state, and the overlapped area of the first body and the second body under the first state is more than that under the second state.

Second Embodiment

Figure 4:
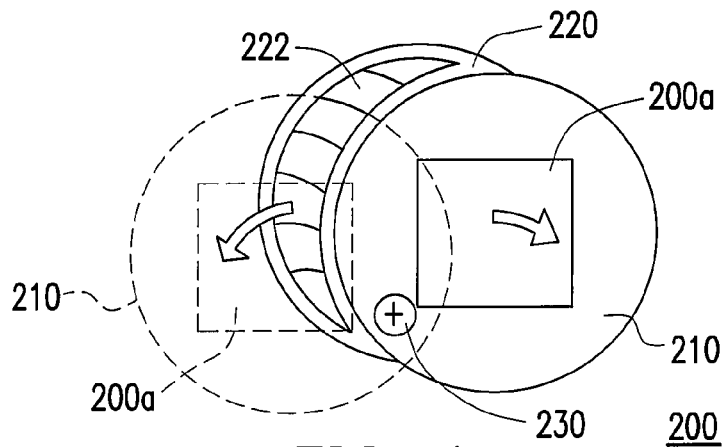
FIG. 4 is a schematic diagram illustrating an electronic device and an application program switching method thereof according to a second embodiment of the present invention.

FIG. 4 is a schematic diagram illustrating an electronic device and an application program switching method thereof according to the second embodiment of the present invention. The second embodiment is similar to the first embodiment, and the detailed description of the similar part will not be repeated.

Referring to FIG. 4, a first body 210 of an electronic device 200 is connected to a second body 220 via a hinge 230, and the first body 210 may be rotated relative to the second body 220.

Similarly, when the external message is received by the electronic device 200, the first body 210 may be pushed to rotate relatively to the second body 220, so as to activate the second application program. Now, the executing frame of the second application program is displayed on a display screen 200a, and the second application program may be executed via an exposed keyboard 222.

Particularly, by rotating the first body 210 towards different directions relative to the second body 220, for example, rotating the first body 210 clockwise or anticlockwise relative to the second body 220, different second application programs may be activated.

Third Embodiment

Figure 5:
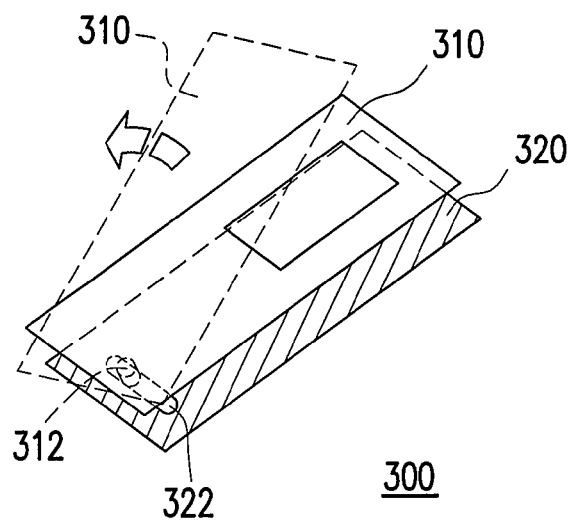
FIG. 5 is a schematic diagram illustrating an electronic device and an application program switching method thereof according to a third embodiment of the present invention.

FIG. 5 is a schematic diagram illustrating an electronic device and an application program switching method thereof according to the third embodiment of the present invention. The third embodiment is similar to the first and second embodiments, and the detailed description of the similar part will not be repeated. The difference there between is described as follows. Referring to FIG. 5, in the present embodiment, a first body 310 is connected to a second body 320 via a hinge 312. To be specific, one end of the hinge 312 is disposed on the first body 310, the second body 320 has a sliding groove 322, and the another end of the hinge 312 is set in the sliding groove 322. Based on the hinge 312 and the sliding groove 322, changing the relative position of the first body 310 and the second body 320 from the first state to the second state includes that the first body 310 is first level shifted, and then rotated relative to the second body 320, or the first body 310 is first rotated, and then level shifted relative to the second body 320, or even level shifted while rotated at the same time according to an actual requirement.

Fourth Embodiment

Figure 6:
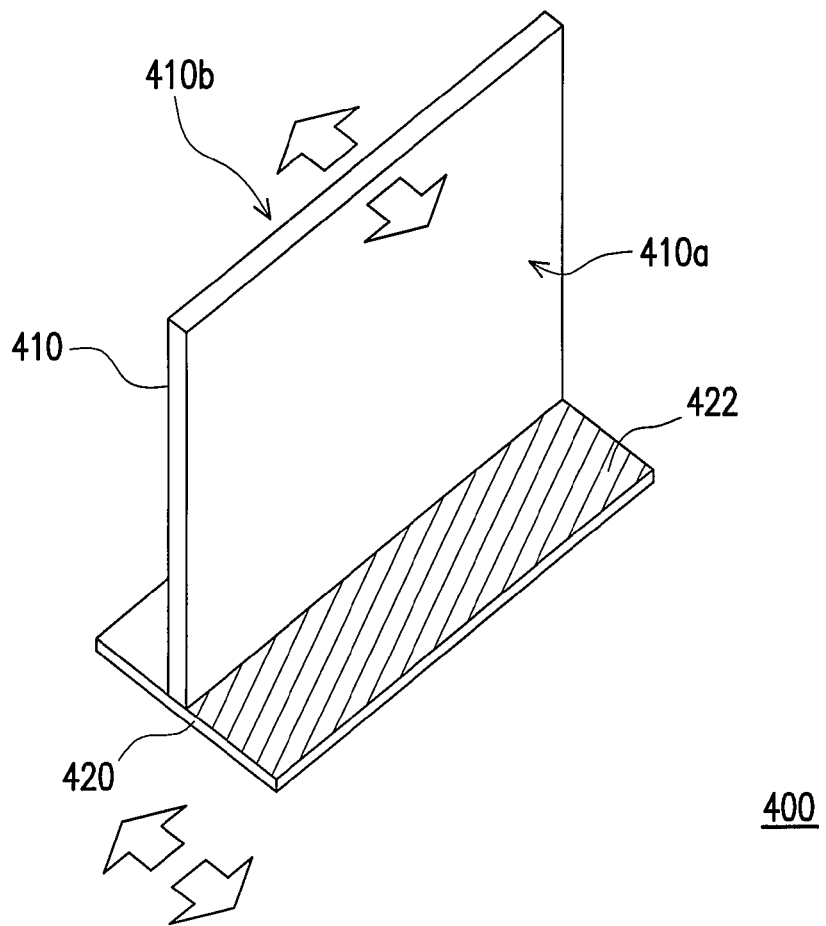
FIG. 6 is a schematic diagram illustrating an electronic device according to a fourth embodiment of the present invention.

FIG. 6 is a schematic diagram illustrating an electronic device according to the fourth embodiment of the present invention. Referring to FIG. 6, the electronic device 400 may be a LCD with dual panels, and a first body 410 and a second body 420 thereof are panel-shaped. The first body 410 is connected to the second body 420 vertically. Wherein, a first display screen 410a and a second display screen 410b are respectively disposed on both sides of the first body 410 of the electronic device 400. In the present embodiment, the first body 410 is slidely connected to the second body 420. The method of slidely connecting the first body 410 with the second body 420 is know by those skilled in the art, and the detailed description thereof will not be repeated. Moreover, the second body 420 has a keyboard 422 directly disposed on a surface where the second body 420 and the first body 410 are connected. In another embodiment, the keyboard 422 may also be externally connected to the second body 420.

Referring to FIG. 1 and FIG. 5, as described in the step S100, the external message is received during the first application program being executed on the electronic device 400, and now an executing frame of the first application program is displayed on the first display screen 410a, while the second display screen 410b may display no frame, a screen saver program or the same executing frame as that of the first display screen 410a.

Next, as described in the step S110, the first body 410 is pushed, such that the relative position of the first body 410 and the second body 420 is changed from the first state to the second state, so as to activate the second application program of the electronic device 400. Meanwhile, the image displayed on the first display screen 410a is changed from the executing frame of the first application program to the executing frame of the second application program, and the second application program is executed via the keyboard 422 located on the second body 420 to reply the external message. It should be noted that to keep the privacy of the user, the executing frame of the second program may not be displayed on the second display screen 410b, alternatively, the second display screen 410b may display no frames, a screen saver program or the executing frame of the first application program according to an actual requirement.

When execution of the second application program is completed, as described in the step S120, the first body 410 is pushed back, such that the relative position of the first body 410 and the second body 420 is changed from the second state to the first state. Now, the displayed image on the first display screen 410a of the electronic device 400 is changed from the executing frame of the second application program to the executing frame of the first application program to continually execute the first application program.

As described above, switching the application programs may be performed by a simple push action of the user, and pressing of hot keys or keyboard is unnecessary. By such means, the electronic device and the application program switching method thereof are continent for the users.

Figure 7:
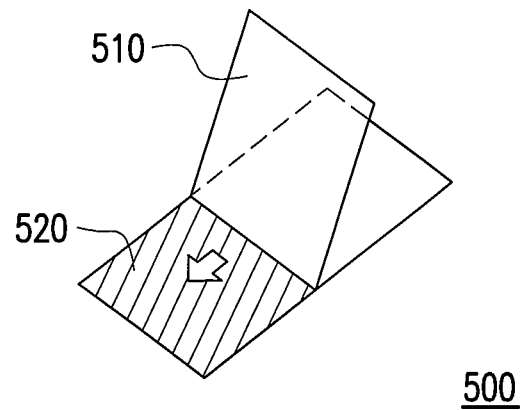
FIG. 7 is a schematic diagram illustrating an electronic device according to a fifth embodiment of the present invention.

In addition, though the first body is substantially connected to the second body vertically according to the present embodiment, in a fifth embodiment, a tilting angle may be formed between a first body 510 and a second body 520 of an electronic device 500, such that the first body 510 is disposed neither parallel nor vertical to the second body 520, as shown in FIG. 7. As described above, sizes of the tilting angles formed between the first body and the second body are not limited by the present invention. Those skilled in the art should be understood that different connection methods of the first body and the second body may be applied without departing from the spirit and scope of the present invention, as long as the application programs may be switched according to the application program switching method of the present invention. Moreover, shapes of the first body and the second body are not limited by the present invention neither. In other words, different shapes such as rectangle, roundness, triangle, sphere, cone, or cylinder etc. of the first body and the second body may be designed according to an actual requirement.

Figure 8:
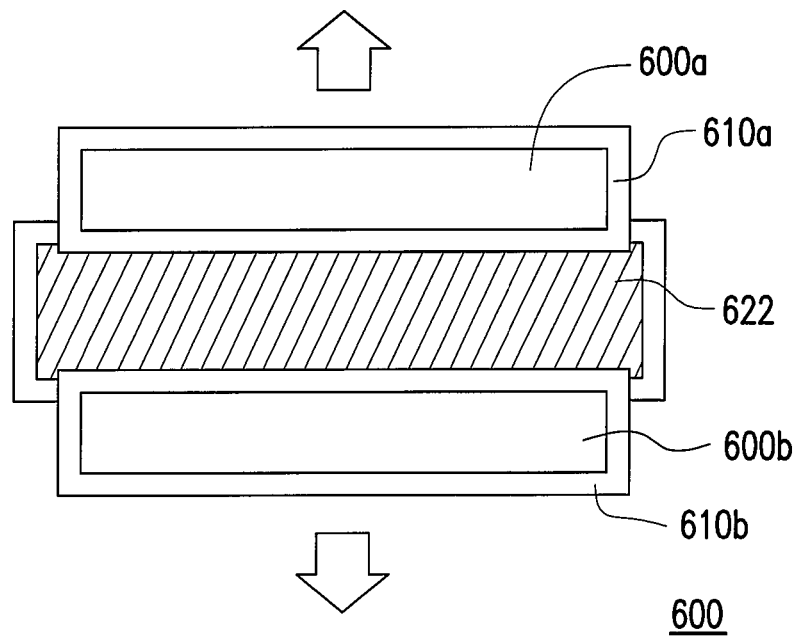
FIG. 8 is a schematic diagram illustrating an electronic device according to sixth embodiment of the present invention.

FIG. 8 is a schematic diagram of an electronic device according to a sixth embodiment of the present invention. Referring to FIG. 8, in the sixth embodiment, an electronic device 600 has two first bodies 610a and 610b, which may be moved oppositely. When the electronic device 600 receives an external message, one of the first bodies 610a and 610b may be pushed, such that the first bodies 610a and 610b may be simultaneously level shifted relative to a second body 620 towards opposite directions to activate the second application program. Now, a keyboard 622 on the second body 620 is exposed, and the executing frame of the second application program is displayed on a first display screen 600a and a second display screen 600b, and meanwhile the second application program may be executed via the keyboard 622.

In summary, based on the electronic device and the application program switching method thereof provided by the present invention, application programs of the electronic device may be switched by simply changing the relative position of the first body and the second body of the electronic device manually. Therefore, the electronic device and the application switching method thereof provided by the present invention have the advantages of laboursaving and timesaving, which are continent for the users.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An application program switching method, for an electronic device comprising a first body and a second body, wherein the second body has a keyboard, the method comprising:

receiving an external message during a first application program being executed on the electronic device;

changing a relative position of the first body and the second body from a first state to a second state to activate a second application program, and a displayed image of the electronic device being switched from an executing frame of the first application program to an executing frame of the second application program to reply to the external message, wherein the keyboard functions as an input interface of the second application program, the first application program is continually executed in the background, the executing frame of the second application program is transitorily displayed on the first display screen, and the executing frame of the first application is immediately switched back to being actively displayed; and changing the relative position of the first body and the second body from the second state to the first state to switch the displayed image of the electronic device from the executing frame of the second application program to the executing frame of the first application program, so as to continually execute the first application program, wherein the first application program and the second application program are switched by manually changing the relative position of the first body and the second body of the electronic device between the first state and the second state and the first application program is active when the electronic device is in the first state, and the second application program is active when the electronic device is in the second state.

2. The application program switching method as claimed in claim 1, wherein the first application program comprises online games, video player, JAVA games, picture player, blue tooth wireless transmission or web browser.

3. The application program switching method as claimed in claim 1, wherein the external message comprises an instant massage, a multimedia message, a short message from a cell phone or an e-mail.

4. The application program switching method as claimed in claim 1, wherein changing the relative position of the first body and the second body from the first state to the second state comprises level shifting, rotating or level shifting and rotating the first body relative to the second body.

5. The application program switching method as claimed in claim 1, wherein when the displayed image of the electronic device is the executing frame of the second application program, the first application program is continually executed or paused.

6. An electronic device, having a first display screen, the electronic device comprising:

a first body; and a second body, connected to the first body, and having a keyboard, wherein when an external message is received during a first application program being executed on the electronic device, a relative position of the first body and the second body is changed from a first state to a second state, so as to activate a second application program of the electronic device, and a displayed image of the electronic device is switched from an executing frame of the first application program to an executing frame of the second application program for executing the second application program to reply to the external message via the keyboard, wherein the keyboard functions as an input interface of the second application program, the first application program is continually executed in the background, the executing frame of the second application program is transitorily displayed on the first display screen, and the executing frame of the first application is immediately switched back to being actively displayed, when the relative position of the first body and the second body is changed from the second state to the first state, the displayed image of the electronic device is switched from the executing frame of the second application program to the executing frame of the first application program to continually execute the first application program, and the first application program and the second application program are switched by manually changing the relative position of the first body and the second body of the electronic device between the first state and the second state, wherein the first application program is active when the electronic device is in the first state, and the second application program is active when the electronic device is in the second state.

7. The electronic device as claimed in claim 6, wherein the first display screen is disposed on a surface of the first body and is not in a same unit as the second body, and when the first application program is executed on the electronic device, the executing frame of the first application program is displayed on the first display screen.

8. The electronic device as claimed in claim 7, wherein the first body is pivotally connected to the second body, and changing the relative position of the first body and the second body comprises rotating the first body relative to the second body.

9. The electronic device as claimed in claim 7 further comprising a sliding mechanism, wherein the first body is connected to the second body via the sliding mechanism, and changing the relative position of the first body and the second body comprises level shifting the first body relative to the second body.

10. The electronic device as claimed in claim 9, wherein the sliding mechanism comprises a sliding block and a sliding rail, the sliding rail is disposed on the second body, and the sliding block is disposed on the first body and is correspondingly set in the sliding rail.

11. The electronic device as claimed in claim 9, wherein the sliding mechanism comprises a hinge and a sliding groove, the sliding groove is disposed on the second body, one end of the hinge is connected to the first body, the other end of the hinge is set in the sliding groove located on the second body, and the hinge is suitable for sliding along the sliding groove, such that the second body is level shifted and rotated relative to the first body.

12. The electronic device as claimed in claim 6, wherein the first body and the second body are panel-shaped, and the first body is substantially connected to the second body vertically.

13. The electronic device as claimed in claim 12 further comprising a second display screen, and the first display screen and the second display screen being respectively disposed at opposite sides of the first body.

* * * * *